United States Patent
Egger et al.

(10) Patent No.: US 9,987,921 B2
(45) Date of Patent: Jun. 5, 2018

(54) SIPHONING-OFF GUARD

(71) Applicant: MAGNA STEYR Fuel Systems GesmbH, Sinabelkirchen (AT)

(72) Inventors: Maris Egger, Markt Hartmannsdorf (AT); Dominik Steinmann, Stubenberg (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 797 days.

(21) Appl. No.: 13/772,432

(22) Filed: Feb. 21, 2013

(65) Prior Publication Data

US 2013/0213964 A1 Aug. 22, 2013

(30) Foreign Application Priority Data

Feb. 21, 2012 (DE) .......................... 10 2012 101 381

(51) Int. Cl.
*B60K 15/04* (2006.01)

(52) U.S. Cl.
CPC .................. *B60K 15/0403* (2013.01)

(58) Field of Classification Search
USPC ........................................................ 220/86.3
See application file for complete search history.

(56) References Cited

U.S. PATENT DOCUMENTS

| 1,813,554 | A | * | 7/1931 | Wickline ...................... 220/86.3 |
| 1,995,007 | A | * | 3/1935 | Myers .......................... 220/86.3 |
| 2,041,070 | A | * | 5/1936 | Jones ........................... 220/86.3 |
| 3,892,330 | A | * | 7/1975 | Hotchkiss et al. ............ 220/86.3 |
| 2006/0065311 | A1 | * | 3/2006 | Hattori et al. ................ 137/592 |
| 2007/0295725 | A1 | * | 12/2007 | Grote et al. .................. 220/86.3 |
| 2008/0156800 | A1 | * | 7/2008 | Mougenot ..................... 220/86.3 |
| 2009/0045186 | A1 | * | 2/2009 | Chang .......................... 219/439 |
| 2009/0134159 | A1 | * | 5/2009 | Wholey et al. .............. 220/86.3 |
| 2010/0028275 | A1 | | 11/2010 | Walkowski et al. |
| 2010/0282757 | A1 | * | 11/2010 | Walkowski et al. .......... 220/562 |
| 2012/0181275 | A1 | * | 7/2012 | Bisaillon et al. ............ 220/86.3 |

FOREIGN PATENT DOCUMENTS

| CN | 1754713 A | 4/2006 |
| CN | 201080172 Y | 7/2008 |
| CN | 201220594 Y | 4/2009 |
| DE | 2360655 A | 6/1975 |
| DE | 2360655 A1 | 6/1975 |
| DE | 20 2009 008494 A | 8/2009 |

OTHER PUBLICATIONS

Office Action and Search Report for Chinese Patent Application No. 201310159248.8, dated Oct. 28, 2015, 2 pages of English translation.

* cited by examiner

*Primary Examiner* — Fenn C Mathew

(74) *Attorney, Agent, or Firm* — Jordan IP Law, LLC; Todd A. Vaughn

(57) ABSTRACT

A siphoning-off guard for a motor vehicle tank system that includes a filler pipe head, a tube and a motor vehicle tank, the motor vehicle tank system contains components which form an end region, the siphoning-off guard being fastened to the end region on the outside surface of the component.

16 Claims, 2 Drawing Sheets

SIPHONING-OFF GUARD

CROSS-REFERENCE TO RELATED APPLICATIONS

The present application claims priority under 35 U.S.C. § 119 to German Patent Application No. 10 2012 101381.0 (filed on Feb. 21, 2012), which is hereby incorporated by reference in its entirety.

TECHNICAL FIELD

Embodiments are related to a siphoning-off guard for tank systems, especially for tank systems which are provided for using fuel having an alcohol content of at least 20%.

BACKGROUND

Especially in the USA, requirements imposed on tank containers are known. In accordance with FMVSS 301, such requirements require measures to be taken to prevent contact of a tube of 1200 mm in length with the surface of the fuel in the tank. The conditions have to be met even if the tank is virtually full. It is therefore necessary to introduce locks into the filling system of the motor vehicle in order to prevent siphoning off.

Theft protection means which are introduced into the filling system of a motor vehicle are known from the literature.

DE 20 2009 008494 discloses a theft protection means, which comprises a hollow cylinder having a casing surface and a basket formed from a base part extending perpendicularly to a centre axis of the filler neck. The basket comprises a basket material having a wide-meshed lattice structure and being provided with through-flow openings. The basket is braced in the interior of the filler neck by flanges and an O-ring and is held by stiction. This is an unsatisfactory solution, since the elasticity of plastics material rapidly diminishes especially in fuel mixtures having a high alcohol content, and secure anchoring is not provided over the service life of the vehicle.

DE 2360655 discloses star-disc-like locking elements which are pushed in the filler neck as far as possible in the direction of the tank. The discs are made of resilient material and the outside diameter of said discs is somewhat larger than the inside diameter of the filler neck. As a result, upon insertion, the arms of the locking elements spread against the inner wall of the filler neck and prevent a displacement in the longitudinal direction of the filler neck. This embodiment also has the weakness that all theft protection means introduced into the filler neck from the outside of the vehicle can be removed again with force.

SUMMARY

In accordance with embodiments, a siphoning-off guard is provided and configured for placement in such a manner so as to limit or otherwise prevent unauthorized removal and meets the authorization requirements in the USA.

In accordance with embodiments, a siphoning-off guard is provided and configured for placement at a location which is inaccessible from the outside of the vehicle.

In accordance with embodiments, a siphoning-off guard is advantageously accommodated in the interior of the filler pipe head where the siphoning-off guard is connected and/or fastened during manufacture and cannot easily be removed from the outside of the vehicle.

In accordance with embodiments, it is furthermore advantageous that the siphoning-off guard is connected or fastened on the outside of an insert, and therefore, the fastening point cannot be manipulated from the outside of the vehicle.

It is advantageous in this case to select a wire structure which has fastener device that can be bent in a simple manner and braced under bias of a spring force.

Embodiments are directed to a siphoning-off guard for a motor vehicle tank system having at least a filler pipe head, a tube, a motor vehicle tank, and a component with an end region, the siphoning-off guard including a body configured for fastening to the end region on an outside surface of the component.

Embodiments are directed to a motor vehicle tank system including a filler pipe head; a tube; a motor vehicle tank; and a siphoning-off guard configured for placement at a location which is inaccessible from the outside of the motor vehicle.

Embodiments are directed to a motor vehicle tank system for a motor vehicle having a motor vehicle tank with a filler pipe head, the motor vehicle tank system including an insert in fluidic communication with the motor vehicle tank, the insert having an insert body having an end region; and a siphoning-off guard configured for fastening to the end region on an outside surface of the insert.

DRAWINGS

Embodiments are illustrated by way of example in the figures and explained in more detail in the description below.

DESCRIPTION

Figure 1:
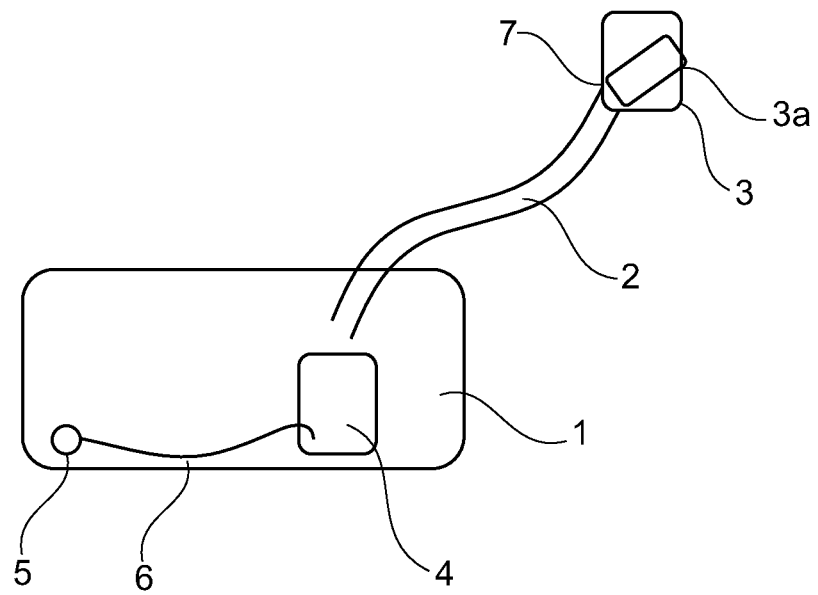
FIG. 1 illustrates schematically a motor vehicle tank.

FIG. 1 illustrates a motor vehicle tank 1 in cross section, the motor vehicle tank having a feeding pipe in the form of a tube 2. The tube 2 is connected fixedly to the motor vehicle tank 1 and can be filled via a filler pipe head 3. The filler pipe head 3 contains an insert 3a which positions the fuel nozzle, which is pushed into the tank opening. A siphoning-off guard 9 is mounted at the end of the insert 3a.

The tube 2 ends either at the outer skin of the tank 1 or is guided into the interior of the tank 1. The tube 2 is composed of flexible or rigid material, such as a metal or plastic or composite and is formed as a single, unitary part or in a plurality of pieces.

In accordance with embodiments, the motor vehicle tank 1 contains a surge tank 4 into which the inflowing fuel first flows. Furthermore, in accordance with embodiments, the sucking jet pump 5 has a feeding pipe 6 in fluidic communication between the sucking jet pump 5 and the surge tank 4. The sucking jet pump 5 is configured to convey the fuel out of lower regions of the tank 1 into the region in which the fuel is sucked up.

The tube 2 is connected to and in fluidic communication with the filler pipe head 3. The insert 3a which has an end region 7 defining a circular-shaped opening 12, which is illustrated more clearly in FIG. 2. The insert 3a is located within the filler pipe head 3. The opening 12 is covered by the siphoning-off guard 9. The siphoning-off guard 9 extends at least over the opening 12 of the end region 7.

In accordance with embodiments, the siphoning-off guard 9 comprises a wire which is bent in a meandering shape having a plurality of spaced apart wire loops 8. In this case, the distances between the wire loops 8 are selected so as to meet the FMVSS requirements, and a tube of the required thickness of 5.2 mm cannot be inserted. As few turns as possible are used in this case so as not to adversely affect the fuel flow.

In accordance with embodiments, the siphoning-off guard 9 is connectable to the end region 7 by a wire piece. For this purpose, the wire is bent out of the plane of the siphoning-off guard 9 in the direction of the end region 7. The fastening or connection of the siphoning-off guard 9 is undertaken on the outside surface(s) of the insert 3a. The inside surface of the insert 3a is configured to guide the fuel nozzle when inserted therein, there are no means for fastening or connecting the siphoning-off guard 9.

Figure 3:
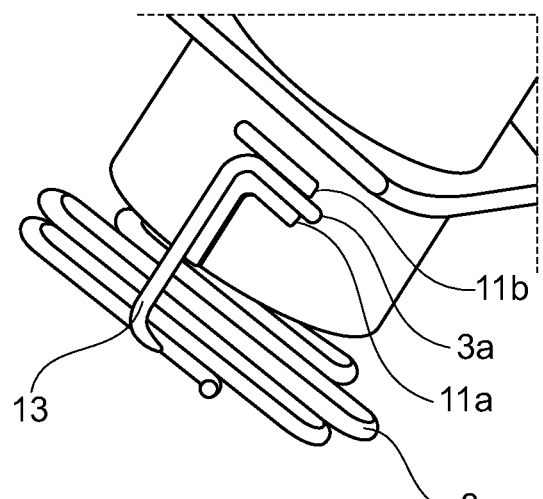
FIG. 3 illustrates a transverse view of the siphoning-off guard.
Figure 4:
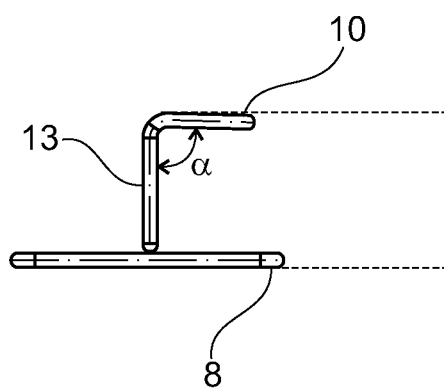
FIG. 4 illustrates a cross section of the siphoning-off guard.

The bending of the wire loops 8 is also illustrated in FIGS. 3 and 4. The extension 10 of the fastening arm 13 is bent a further time and forms an angle alpha between the fastening arm 13 and the extension 10. As illustrated in FIG. 4, the angle alpha is somewhat less than 90 degrees, and therefore, the extension 10 can be braced in the fastening, which runs at a right angle. The siphoning-off guard is installed on the end region 7. A structure is provided for this purpose on the outside of the end region 7.

Figure 2:
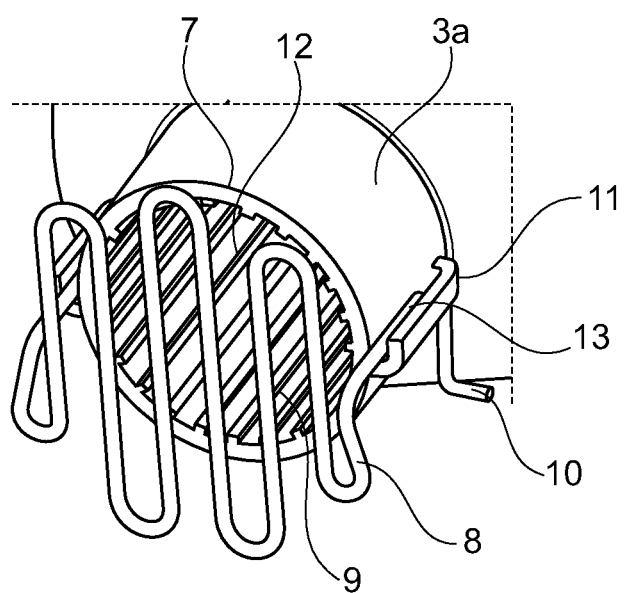
FIG. 2 illustrates a top view of a siphoning-off guard.

As illustrated in FIGS. 2 and 3, the tubular end region 7 of the insert 3a has spaced apart guide 11 having grooves 11a and 11b on the outside surface thereof. The guide groove 11a has an L-shaped profile, and therefore, the extension 10 and the fastening arm 13 bear against the L-shaped structure. In addition, the guide groove 11b also forms a stop which runs parallel to the short side of the L-shaped guide groove and is at a distance from the latter suitable for receiving the wire. The profile of the guide grooves 11a, 11b is positioned at a right angle. Since, however, the wire is bent at a smaller angle, the wire is braced under a biasing spring force.

The siphoning-off guard 9 is fastened or connected directly to the end region 7 of the insert 3a. The fastening is undertaken directly during the assembly of the tank system by clipping the wire into the guides formed by grooves 11a, 11b of the end region 7. The insert 3a is subsequently installed in the filler pipe head 3. By way of the installation, the location at which the siphoning-off guard 9 is fastened or connected is protected against manipulation. The fastening point is fastened in the filler pipe head 3 so as not to be accessible from the outside of the vehicle.

In accordance with embodiments described in detail, a system includes a receptacle and clips. In this case, a person skilled in the art is free to configure the outside of the insert 3a as a receptacle or as a clip, and vice versa.

Figure 5:
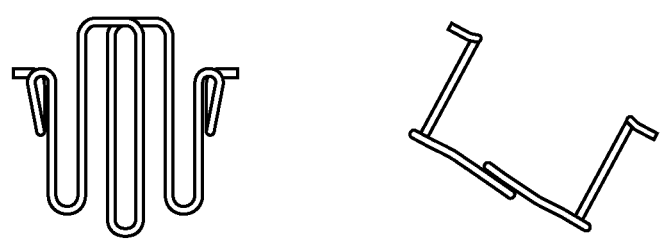
FIG. 5 illustrates an alternative embodiment of the siphoning-off guard.

FIG. 5 illustrates an alternative embodiment in which the arrangement of the wire loops differs.

The siphoning-off guard 9 is also protected from the inside against easy removal, since it is very difficult to pull it out via the tank opening. Should anyone want to pull the siphoning-off guard 9 out of the insert 3a, for example with a wire, the force applied to the siphoning-off guard 9 is absorbed by the edges of the end region 7, and therefore, by the filler pipe head 3 itself.

The position at which the siphoning-off guard 9 is fitted may also be located even further into the tank system. The end region of the tube 2 or the neck at which the tube 2 ends on the tank side is conceivable in this case. Components in the motor vehicle tank system which are suitable are those which form an opening 12 which is closed by the siphoning-off guard 9. The siphoning-off guard 9 forms openings which are less than 60 mm at a widest point respectively thereof. It is important here for the fastening always to lie outside the path over which the fuel travels and which would be accessible via the tank opening.

The structural configuration of the siphoning-off guard 9 itself may be different. The meandering shape makes it difficult to pull the guard 9 out of the insert 3a, since individual wire loops 8 can be twisted against one another when force is applied. It is important that the fastening of the guard 9 makes easy removal impossible and that the end region 7 to which the siphoning-off guard 9 is fitted absorbs the force in the event of a removal attempt from the outside of the vehicle.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor vehicle tank system comprising:
   a filler pipe head;
   a tube;
   a motor vehicle tank;
   an insert in fluidic communication with the motor vehicle tank, the insert having an insert body with an end region and spaced apart guide grooves on the outside surface thereof; and
   a siphoning-off guard having a fastening arm which engages in the guide grooves of the end region to fasten the siphoning guard at the end region which is inaccessible from the outside of the motor vehicle.

2. The motor vehicle tank system of claim 1, wherein the guides extend at least partially in the direction of a longitudinal axis of the end region.

3. The motor vehicle tank system of claim 1, wherein the siphoning-off guard forms openings which are less than 60 mm at a widest point respectively thereof.

4. The motor vehicle tank system of claim 1, wherein the siphoning-off guard is fastened to the end region on the outside surface of the insert under bias of a spring force.

5. The motor vehicle tank system of claim 1, wherein a first one of the guide grooves has an L-shaped profile.

6. The motor vehicle tank system of claim 5, wherein the fastening arm bears against the first one of the guide grooves.

7. The motor vehicle tank system of claim 5, wherein a second one of the guide grooves forms a stop which runs parallel to a short side of the L-shaped profile of the first one of the guide grooves.

8. The motor vehicle tank system of claim 1, wherein the siphoning-off guard is fastened in a direction of a longitudinal axis of the end region.

9. A motor vehicle tank system for a motor vehicle having a motor vehicle tank with a filler pipe head, the motor vehicle tank system comprising:
   an insert in fluidic communication with the motor vehicle tank, the insert having an insert body having an end region and spaced apart guide grooves on the outside surface thereof; and a siphoning-off guard having a fastening arm which engages in the guide grooves of the end region to fasten the siphoning guard to the end region on an outside surface of the insert.

10. The motor vehicle tank system of claim 9, wherein a first one of the guide grooves has an L-shaped profile.

11. The motor vehicle tank system of claim 10, wherein the fastening arm bears against the first one of the guide grooves.

12. The motor vehicle tank system of claim 10, wherein a second one of the guide grooves forms a stop which runs parallel to a short side of the L-shaped profile of the first one of the guide grooves.

13. A motor vehicle tank system comprising:
a motor vehicle tank;
an insert in fluidic communication with the motor vehicle tank, the insert having an insert body with an end region and spaced apart guide grooves on the outside surface thereof; and
a siphoning-off guard having a fastening arm with an extenson which is bent at an angle relative to the fastening arm and which extends through the space formed by the guide grooves of the end region to fasten the siphoning-off guard at the end region on an outside surface of the insert.

14. The motor vehicle tank system of claim 13, wherein a first one of the guide grooves has an L-shaped profile.

15. The motor vehicle tank system of claim 14, wherein the extension and the fastening arm bear against the first one of the guide grooves.

16. The motor vehicle tank system of claim 14, wherein a second one of the guide grooves forms a stop which runs parallel to a short side of the L-shaped profile of the first one of the guide grooves.

* * * * *